April 8, 1930.  J. MITCHELL ET AL  1,754,174
STEAM REGULATOR VALVE AND THE LIKE
Filed Oct. 31, 1927
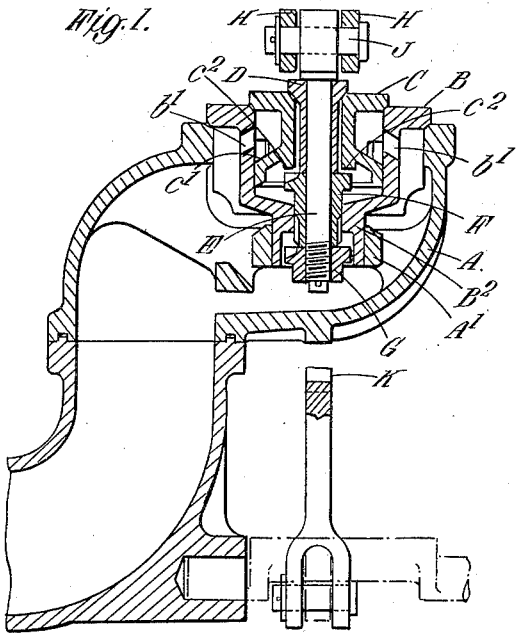
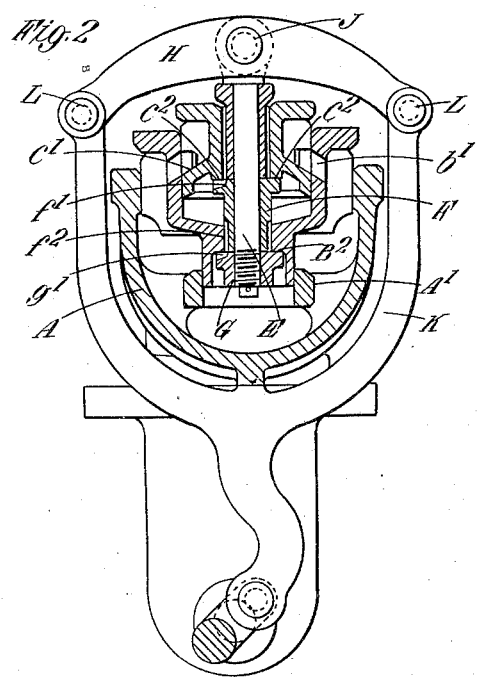
Inventors
J. Mitchell
and J. C. G. Cossey
by Wilkinson & Fisher
Attorneys.

Patented Apr. 8, 1930

1,754,174

UNITED STATES PATENT OFFICE

JOHN MITCHELL AND JOHN CECIL GEORGE COSSEY, OF LONDON, ENGLAND

STEAM-REGULATOR VALVE AND THE LIKE

Application filed October 31, 1927, Serial No. 230,082, and in Great Britain November 24, 1926.

This invention relates to valves of the multiple beat type, and more particularly to steam regulator valves, the main objects of the invention being the provision of a valve having a large inlet opening, with valve members having short lifts from their respective seats, which members are easily operated against high pressures, and in which valve leakage, owing to unequal expansion of the valve members and valve casing, is eliminated. These objects are attained, according to this invention, by arranging a plurality of valves or valve members, concentrically one within the other, such valves being not less than three in number. The valves can be operated by projections on a single spindle which passes through the innermost valve, but which are preferably on a member surrounding the spindle, or the projections may be on the valves, or some of the projections on the valves and others on the valve spindle, or its surrounding member. One or more projections, of any suitable form or shape, may be used to operate each of the valves. By arranging the diameters and lifts of the valves, the inlet openings can be graduated to suit all conditions.

The bottom portions of the valves may be formed to fit one within the other, so that partial or complete balance of one or more of the valves may be obtained. Also, the inner surface of one valve may serve as a cylinder in which another valve can slide.

A steam space is conveniently provided between one valve and another, in the concentric series. The inlet is preferably arranged at the top of the valve chamber, and the valves are preferably inserted into the valve chamber from the top, the valve chamber forming a seating for the outermost valve.

The construction described possesses the considerable advantage that the steam or other fluid on its passage through the valves acts as a scavenger and prevents the accumulation of grit in the ports, or other parts of the valve members and valve chamber. Also, the valves and valve chamber are accessible and permit easy regrinding, and it is unnecessary to remove the valve chamber from the flange of the outlet pipe for this purpose.

One form of construction of the invention is illustrated in the accompanying drawings, in which:—

Fig. 1 is a sectional elevation: and
Fig. 2 is a sectional end view.

As shown, the main body A, of the valve has three valves, B, C and D, concentrically arranged in it.

The valves can be operated by any suitable form of operating rod and lever which can be connected to the lifting fork, K, which is connected by pins, L, L, to the bridle H, which in turn is connected by the pin J, to the communal valve spindle, E.

On raising the lifting fork K, and the bridle H and the spindle E, on which is mounted the small valve D and the distance piece F, which latter is secured by the nut G, the small valve D is lifted from its seat on the valve C, allowing steam to pass beneath the bevel of the valve D and down between the valves D and C to the underside of the valve C, which is constructed as a piston working in valve B.

This admission of steam to the underside of valve C puts the latter into a state of equilibrium.

If the bridle H and the spindle E be lifted further, the distance piece F comes into contact with projections $C^2$ on the valve C, which now being in equilibrium, can be lifted without effort.

Steam now passes under the bevel of valve C and through ports $b^1$ in the valve B and so into the main steam pipe to the steam chest and cylinders.

On further movement of the bridle H and spindle E, the spindle nut G comes in contact with projections $B^2$ on the valve B and lifts it off its seat on the main body, or cathead, A.

It is possible for this to be done because the steam pipe is full of steam, which has entered through the ports $b^1$, with the result that the valve B is in equilibrium, and therefore, easy to move.

The travel of the spindle is controlled by a distance piece on the lifting fork K coming in contact with a distance piece on the main body, or cathead A.

It will also be seen from Fig. 2 that ports $f^1$ and $f^2$ are formed in the distance piece F, and a port $g^1$ in the brass nut G. By the scouring action of the passing steam, these ports prevent any accumulation of scale or dirt in the chamber between the valve B and the valve C.

When the regulator is fully open, the steam passing between the valve C and valve B is directed down the inclined plane $c^1$ and through the port $b^1$, thus scouring valve C and preventing any accumulation of scale or dirt.

As shown in Fig. 1, the base of the main body, A inside and underneath the valves is inclined so that the steam passing from the boiler to the steam pipes and steam chest and cylinders, scours out the main body, and prevents any accumulation of scale and dirt.

A guide for the valve B is formed by a bearing $A^1$ which is integral with the cathead A.

From the construction described above, it will be noticed that the total lift of the fork K is quite short, and yet permits of a large valve opening from boiler to steam pipes through the valves.

The valves all return quietly to their seats on closing. The valve B does this because the valve C is still admitting steam, and there is consequently no wire drawing of steam between the valve B and main body, or cathead, A.

In turn the valve C returns to its seat quietly, because steam is still being admitted through valve D into the chamber below the valve C.

The main body, or cathead, A is of cup-like or hemispherical shape, thus minimizing the effects of distortion, due to expansion or contraction with variations of temperature, due to the rising and falling of the pressure of steam.

The steam is admitted only from the top of the main body, A to the main steam pipe, and so to the valve chest and cylinders.

The regulator valve can be combined in the superheater header in the smokebox of a locomotive if desired, or can be placed on the steam pipes in the smokebox before they enter the steam chest.

This type of valve can readily be fitted to existing locomotives without any alterations to either the operating gear, or the existing steam pipes.

It is possible to grind the valves in position on the locomotive, without removing the valves from the main body, or cathead, A, but simply by removing the pins L and J.

Having thus described the nature of the said invention and the best means we know of carrying the same into practical effect, we claim:—

1. A steam regulator valve for locomotives or other fluid operated engines, in which the main body contains at least three concentric valves, in which one or more of the valves, or a portion thereof, acts as a piston within another valve.

2. A steam regulator valve for locomotives or other fluid operated engines, having at least three concentric valves and in which the valves are provided with ports for admitting steam from under the bevel of one valve to the underside of the next valve only in series, as each valve is open.

In testimony whereof we have signed our names to this specification.

JOHN MITCHELL.
JOHN CECIL GEORGE COSSEY.